UNITED STATES PATENT OFFICE.

CHARLES H. SEAMAN, OF MILWAUKEE, WISCONSIN, ASSIGNOR TO OTTO H. FOERSTER, OF MILWAUKEE, WISCONSIN.

PROCESS FOR TREATING ARTIFICIAL STONE, &c.

1,085,227. Specification of Letters Patent. Patented Jan. 27, 1914.

No Drawing. Application filed March 4, 1912. Serial No. 681,621.

*To all whom it may concern:*

Be it known that I, CHARLES H. SEAMAN, a citizen of the United States, residing at Milwaukee, in the county of Milwaukee and State of Wisconsin, have invented a certain new and useful Improvement in Processes for Treating Artificial Stone, &c., of which the following is a full, clear, concise, and exact description.

My invention relates to a method or process of treating artificial stone or similar substance so that these substances may be rendered impervious to attack by the ordinary agents brought in contact with them without the necessity of glazing them or treating them in some other elaborate manner.

I find that certain compositions of matter, of which one is given in my co-pending application for Letters Patent, Serial No. 681,620, filed March 4, 1912, are very readily susceptible to my improved treatment making them impervious to the attacks aforesaid. I will give a specific instance of this treatment together with the material to which it may be applied and it will, of course, be readily apparent to those skilled in the art that many equivalents are available for accomplishing the result which are still within the scope of my invention.

Take for instance the composition referred to in my co-pending application which is as follows:

| | |
|---|---|
| Powdered calcined magnesite | 33⅓% |
| Powdered glass | 16⅓% |
| Powdered quartz | 16⅓% |
| Marble dust | 16⅓% |
| Feldspar | 14⅓% |
| Light calcined magnesia | 3⅓% |
| | 100% |

Instead of using feldspar I may even have a whiter substance if I use marble flour. The above mixture is suitably mixed with magnesium chlorid of 22$\frac{5}{10}$ density to form a thick cream. This composition of matter when properly cast will result in a white stone-like body which lends itself readily for refrigerator linings and of course for other uses. This composition of matter is white if properly cast, but is porous the same as all other similar compositions. Moreover, in articles made from compositions of this type, it necessarily results from the process of manufacture that more or less water remains mechanically held within the pores of the material; and in the absence of special dehydrating treatment, such moisture tends to remain *in situ* indefinitely. This is undesirable on several grounds. For one thing, moisture thus present hinders a sealing or waterproofing agent of the type herein contemplated from readily entering into and filling the porosities of the composition to be treated. Furthermore moisture is apt to give the approximate whiteness of the composition a darkened tint or shade; something which lessens its value for certain purposes, as in linings for refrigerators, where a clean pure white is much sought.

My improved process for treating such compositions of matter as herein outlined and others of the same or equivalent characteristics renders these compositions of matter impervious to attack of agents liable to be brought into contact with them and improves their appearance. Of course my process may be suitably changed in order to afford protection against various attacking agents as will be readily apparent to those skilled in the art. Take, for instance however, when my improved process is applied to the particular composition of matter above set forth, and assuming that the composition of matter is to be used as a refrigerator lining, then the ordinary attacking agents of a distinctive nature might be blood stains or preserves, fatty substances, or whatever is usually placed in a refrigerator; and the protective agent may therefore be in the nature of a waterproofing material.

To render artificial stone or natural stone of similar characteristics impervious to attacks of such agents, I dissolve a fatty acid, stearic acid in this particular case, in wood alcohol (methyl alcohol) and apply it to the outer surface of the material, allowing the pores to fill and thereafter the material treated will be impervious to the attacks aforesaid. The alcohol employed, besides serving as a carrier for the fatty acid or sealing material, acts furthermore as a water absorbent or dehydrating agent. Alcohol, especially when concentrated, has an affinity for water, absorbing it with avidity. When a sufficiently fluent alcoholic solution of a sealing agent is applied to the surface of a stone-like material of the type described, the alcohol penetrates into the porosities of the composition, carrying the sealing agent with it and taking up and binding whatever moisture may be present in the stone. The volatile solvent carrier, wood alcohol in the present example, subsequently evaporates, the moisture which it has absorbed evaporating with it. The pores of the material treated are thus left sealed with stearic acid, which is solid at ordinary temperatures and is non-volatile, while the original moisture content has been largely or wholly eliminated. This specific illustration of the manner of treatment will readily indicate the general nature of the invention. In the specific application of my invention under consideration, the proportions used are two ounces of stearic acid shaved into small finely divided particles dissolved in one quart of wood alcohol. Stearic acid is readily dissolved in alcohol with the aid of heat. This may be suitably applied with a brush to the surface of the refrigerator lining or other stone-like material to be treated. The proportion of alcohol in the treating mixture being very large as compared to that of the sealing agent, stearic acid in this case, the treating mixture is highly fluent and penetrates readily into the porosities of the stone material to be treated. The dehydrating action of the alcohol is therefore utilized to the fullest extent; and the subsequent evaporation of the alcohol, together with the moisture abstracted by it, leaves the refrigerator lining thoroughly waterproofed both superficially and interiorly and also improves its tint. Any stains thereafter may be readily washed off, the porousness of the material having disappeared.

That the broad nature of the invention herein is of course susceptible to many modifications will be readily apparent to those skilled in the art, and What I therefore claim as new and desire to secure by Letters Patent is:

1. The process of treating stone-like bodies to remove moisture therefrom and to render the same non-porous which comprises treating such a body with a highly fluent and penetrating mixture of a fatty acid and a moisture-absorbing agent.

2. The process of treating stone-like bodies to remove moisture therefrom and to render the same non-porous which comprises treating such a body with a highly fluent and penetrating mixture of stearic acid and a moisture-absorbing agent.

3. The process of treating stone-like bodies to remove moisture therefrom and to render the same non-porous which comprises treating such a body with a highly fluent and penetrating mixture of a fatty acid and an alcohol.

4. The process of treating stone-like bodies to remove moisture therefrom and to render the same non-porous which comprises treating such a body with a highly fluent and penetrating mixture of stearic acid and alcohol.

5. The process of treating stone-like bodies to remove moisture therefrom and to render the same non-porous which comprises applying to the surface of such a body a solution comprising a fatty acid and an alcohol substantially in the proportion of two ounces of fatty acid to one quart of the alcohol.

6. The process of treating stone-like bodies to remove moisture therefrom and to render the same non-porous which comprises applying to the surface of such a body a highly fluent and penetrating mixture comprising a sealing agent adapted to enter and seal the porosities of said body and a relatively large proportion of a volatile carrier solvent for said sealing agent, said solvent being capable of taking up moisture and removing the same upon subsequent evaporation.

7. The process of treating stone-like bodies to remove moisture therefrom and to render the same non-porous which comprises applying to the surface of such a body a solution comprising a fatty acid dissolved in wood alcohol in the proportion of two ounces of fatty acid to one quart of wood alcohol.

In witness whereof, I hereunto subscribe my name this 23rd day of February, A. D. 1912.

CHARLES H. SEAMAN.

Witnesses:
EDNA KLAHUNDE,
W. H. McREYNOLDS.